United States Patent [19]

Rothman et al.

[11] 4,160,197

[45] Jul. 3, 1979

[54] CIRCUIT ARRANGEMENT FOR RECORD PLAYERS PERFORMING THE SETTING BACK OF THE DISC INTO A PRE-DETERMINED START POSITION

[75] Inventors: György Rothman; György Babos; Mária Gyarmati née Hardik; Árpád Hegedüs; Ottó Rofa, all of Budapest, Hungary

[73] Assignee: Mechanikai Laboratorium Hiradastechnikai Kiserleti Vallalat, Budapest, Hungary

[21] Appl. No.: 871,790

[22] Filed: Jan. 24, 1978

[51] Int. Cl.² .............................................. G05B 13/02
[52] U.S. Cl. ...................................... 318/396; 318/269
[58] Field of Search ................. 318/64, 101, 255, 256, 318/260, 263, 264, 269, 272, 276, 277, 396

[56] References Cited

U.S. PATENT DOCUMENTS

| 3,309,597 | 3/1967 | Gabor et al. ...................... 318/396 X |
| 3,614,572 | 10/1971 | Usher .................................... 318/396 |
| 3,617,843 | 11/1971 | Neumann et al. ................... 318/272 |
| 4,086,520 | 4/1978 | Hashizaki et al. ................... 318/269 |
| 4,090,118 | 5/1978 | Smith, Jr. ......................... 318/396 X |

OTHER PUBLICATIONS

"Digital Velocity Servomechanism" by Dobransky and Rice, IBM Technical Disclosure Bulletin, vol. 14, No. 3, Aug. 1971, pp. 685, 686.

Primary Examiner—J. V. Truhe
Assistant Examiner—W. E. Duncanson, Jr.
Attorney, Agent, or Firm—Young & Thompson

[57] ABSTRACT

A circuit arrangement for record players is disclosed for presetting of the disc. The disc is set back by a specific rotation angle before starting the turntable so that it will accelerate to the proper angular velocity at the proper time for synchronizing program material.

3 Claims, 2 Drawing Figures

CIRCUIT ARRANGEMENT FOR RECORD PLAYERS PERFORMING THE SETTING BACK OF THE DISC INTO A PRE-DETERMINED START POSITION

The invention is related to a circuit arrangement for record players offering the possibility to perform the setting back of the disc as necessary to obtain a suitable speed-up compensation in an automatic way. Up till now, according to prior art this operation had to be performed manually. It is an essential requirement for studio record players that the start of the wanted programme such as a piece of music or a part of same or a passage of a context shall be possible in accurate co-incidence with a given musical beat or a given syllable of a word and that without disturbing effects such as distortion. Moreover, a high fidelity tone reproduction is only possible if the turntable is at the instant of starting the programme rotating exactly with a revolution number equal to the nominal speed. In order to reach the said rotating speed, the turntable has—within the period between the start of the movement and the start of the programme—to pass a path corresponding with a certain rotation angle which is specific—and different—for the different drive systems. The said specific rotation angle is dependent on the one hand on the moment of inertia ( $\ominus$ ) of the whole mass being in rotation, on the other hand on the starting torque (M), and also on the wanted angular velocity ($\omega_o$) so that the specific rotation angle $\phi_o$ can be given by the following formula:

$$\phi_o = \ominus /M = \cdot \omega_o^2.$$

The disc must before the start of the turntable be set back by this specific rotation angle $\phi_o$ in order to accelerate it to the exact angular velocity $\omega_o$ just at the instant when the initial bar is next to the cartridge of the tone arm.

According to prior art the setting back is generally performed in the following manner: The operator lets the tone arm down into that part of the set of grooves that includes the desired initial bar. The accurate location of the spot is facilitated by an intensive illumination of the stylus and—maybe—by mounting a magnifier to the end of the tone arm just above the stylus. The operator then turns the turntable manually around and checks the programme by listening on the cue output. As a consequence of the manual turning, the velocity of the play-back will vary and even the sense of the rotation can be changed. It is namely essential that the operator locates—by this turning on and back—the very position in which the stylus is set immediately before the initial bar (taking into consideration the sense of the working rotation). (It has already been mentioned that the necessary setting back is according to prior art performed manually and the automation of this operation is the purpose of our invention.) The extent of the necessary setting back, i.e. the specific angles $\phi_1, \phi_2, \ldots, \phi_n$ belonging to the different angular velocities $\omega_{o1}, \omega_{o2}, \ldots, \omega_{on}$ are marked at the edge of the turntable by dots at the end of corresponding arc sections, $i_1, i_2, \ldots, i_n$.

The said dots are positioned in a way that—reckoned from a common spot to be catched by the operator—the dots follow each other in the order of their index numbers in the sense contrary to the one of the working rotation. They are generally numbered by the value of r/m and the operator has to turn back the turntable to the dot marked by the speed in question. Besides there are also applied delay circuits in order to disconnect the line output for the period of the speed-up process so that neither the programme passages played back during the speed-up process nor the noise caused by the stylus if it runs within the inlet groove becomes perceptible.

The manual turning back of the turntable is, however, unfavourable for many disadvantages the main ones being specified as follows:
1. The process is liable to great manual errors caused by the operator and being, thus, no system errors so that an unrepeatable inaccuracy occurs.
2. A wobbling inaccuracy is also caused by both the unsteady character of the mains voltage and the changing influence of the bearing frictions on the speed-up process.
3. The setting of the delay period is also manually performed and that separately for each nominal speed.
4. A synchronism with the delay periods set manually can over longer spans of time not be maintained.
5. The operator can by uncareful proceedings cause a derailment of the stylus off the groove.

The invention is based on the conception that the drive motor of the turntable itself can be used for the setting back of the disc if a motor is used that can be reversed and the arrangement is provided with a reversing means, a period copying means and a speed control unit that is designed according to the special requirements arising from the said task. The said speed control unit is preferably designed in a manner that it can not only be set to the standard speeds of the record player but also to speeds the values of which being equal to the product of any standard speed with a certain constant, and it supplies a signal whenever a selected speed is reached during the speed-up of the turntable. The invention can of course be reduced to practice with record players fitted for only a single standard speed but there is generally a need for its working on different, selectable standard speeds, and this can only be obtained if a speed selector stage is also be provided for. The main advantages of the invention can also be achieved if there is no measure taken to automatize the delay of the sound output simultaneously but if the disadvantages as specified herinbefore under items 3 and 4 shall also be avoided, the solution has to be combined with the tone switch, too.

The invention will now be described referring immediately to the accompanying drawings in order to facilitate its understanding.

Figure 1:
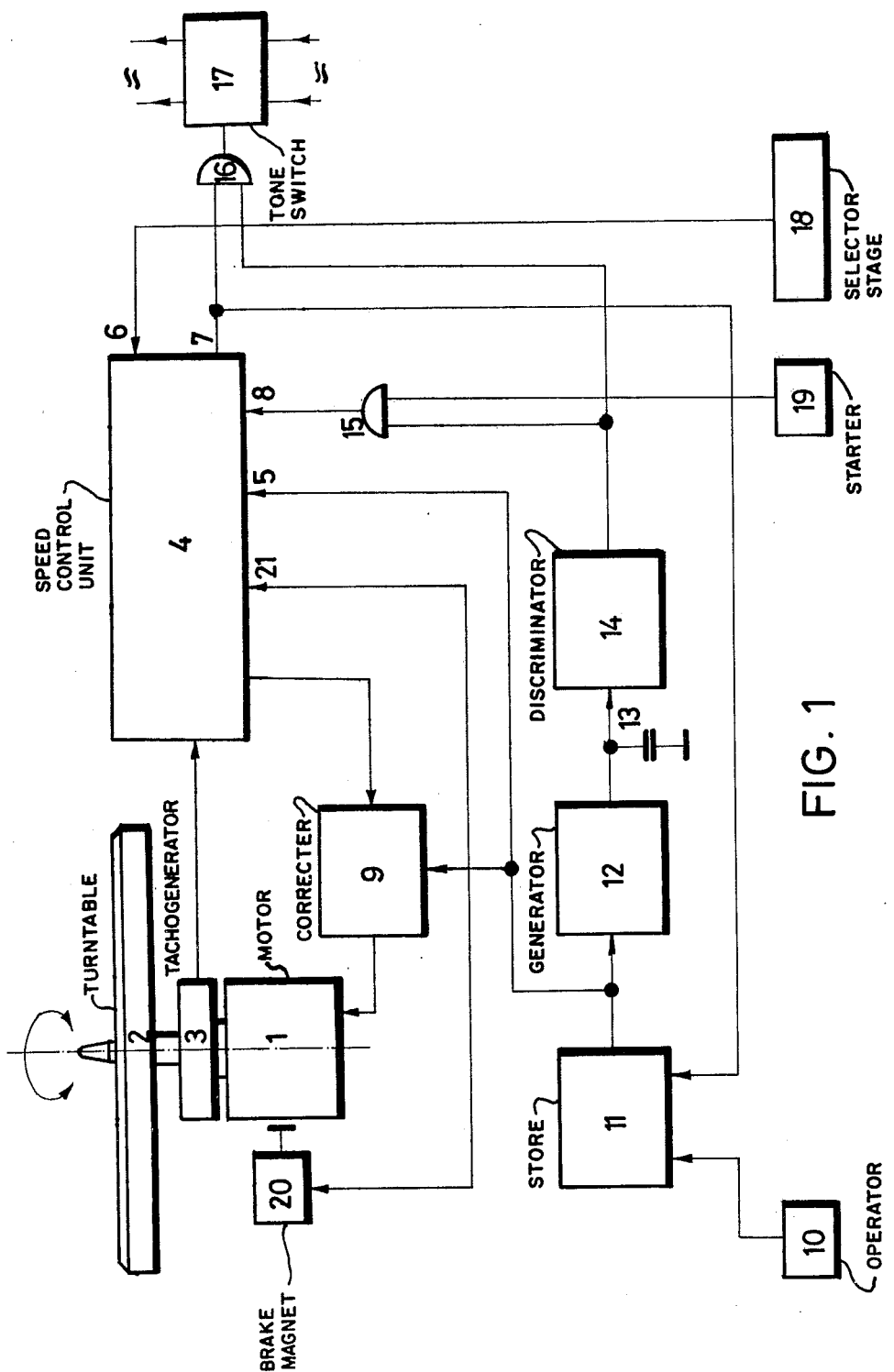
FIG. 1 shows the block diagram of a preferred embodiment of the invention that includes also the optional units such as speed selector stage and tone switch.

It can be seen that the turntable 2 of the record player, the drive motor 1 for the said turntable 2, and a tachogenerator 3 are arranged at a common axle and, thus, rigidly coupled to each other. The tachogenerator 3 is connected to an input of the speed control unit 4. The arrangement comprises a start-operating means 19, a brake magnet 20 and a correcting means 9 that is coupled over its first input to the first output of the said speed control unit 4 and over its output to the operating input of the said motor 1. The second output 21 of the said speed control unit 4 is connected to the operating input of the said brake magnet 20.

The invention consists in that the third output 7 of the said speed control unit 4 is connected to the first input of a store 11, the output of the said store 11 is connected to one input of a controllable current generator 12 as well as to one input of the said correcting means 9 and one input of the said speed control unit 4, the output of the current generator 12 is connected on the one hand to one plate of a storing capacitor 13 the other plate of which being connected to a constant potential such as the common potential of the circuit arrangement and on the other hand to the input of a threshold level discriminator 14 the output of which being connected to one input of a logical gate circuit 15 whereas the output of the said gate circuit 15 is connected to the third input 8 of the said speed control unit 4, and the operating means 10 of the circuit arrangement is connected to the second input of the said store 11 whereas its start-operating means 19 is connected to the other input of the said gate circuit 15.

It has already been mentioned that a preferred embodiment of the invention is provided with a speed selector stage 18 that is connected to the second input 6 of the said speed control unit 4. And an embodiment designed for performing the delay of the sound output simultaneously has to be provided with a tone switch 17 to the control input of which are over a further gate circuit 16 connected on the one hand the third output 7 of the said speed control unit 4 and on the other hand the output of the said threshold level discriminator 14.

The motor 1 drives the turntable 2 immediately, and also the tachogenerator 3 the output signal of which is fed to the signal input of the electronic speed control unit 4. The speed control unit 4 can be switched over in two different senses. On the one hand for selecting a wanted disc speed (if the record player is designed for only a single standard speed, this facility is omitted). The standard speed selection is performed over the second input 6 of the speed control unit 4. On the other hand the speed control unit 4 can over its first input 5 be commutated from a selected standard speed to $1/\sqrt{2}$ times the same ($1/\sqrt{2}=0.707$). The correcting means 9 is inserted between the output of the said speed control unit 4 that supplies the control signal for the motor 1 and the corresponding terminal of the said motor 1. The correcting means 9 controls not only the speed of the motor 1 but also the sense of the revolution, i.e. it performs also the reversing. The third output 7 of the speed control unit 4 supplies an output signal whenever the speed-up process has led to the acceleration of the motor 1 to the very speed selected over the first input 5 or the second input 6 of the speed control unit 4. A stop command supplied to the third input 8 of the speed control unit 4 causes the disconnection of the motor 1 off the mains and also the activation of the brake magnet 20 over the second output 21 of the speed control unit 4. Consequently the brake magnet 20 gets effective and both the motor 1 and the turntable 2 coupled rigidly to the former one get fixed in their instantaneous position. The setting back operation is started by the operating means 10 that is connected to the second input of the store 11. The output of the store 11 controls the correcting means 9 as far as the reversing is concerned and it supplies a command to the first input 5 of the speed control unit 4 effecting the change of the real revolution number of the motor 1 from the one corresponding with the standard speed previously selected by the speed selector stage 18 over the second input 6 of the unit 4 to 0.707 times the same. (If only a single standard speed is provided for, there is no speed selector stage 18 and the command supplied by the store 11 to the first input 5 of the unit 4 effects the change to a revolution number 0.707 times that of the single standard speed.) It has been mentioned hereinbefore that the store 11 is over the current generator 12 coupled also to the store capacitor 13 and the threshold level discriminator 14. The output of the threshold level discriminator 14 is coupled to the third input 8 of the unit 4 over a gate circuit 15 that is controlled by the start-operating means 19. In the embodiment as set forth by way of example the threshold level discriminator 14 is also coupled to the tone switch 17 over a further gate circuit 16 that is controlled from the third output 7 of the speed control unit 4. The tone switch 17 is inserted into the sound output line either in series or shunting it. The signal appearing at the third output of the unit 4 causes also the clearing of the store 11 over the first input of the latter one.

Figure 2:
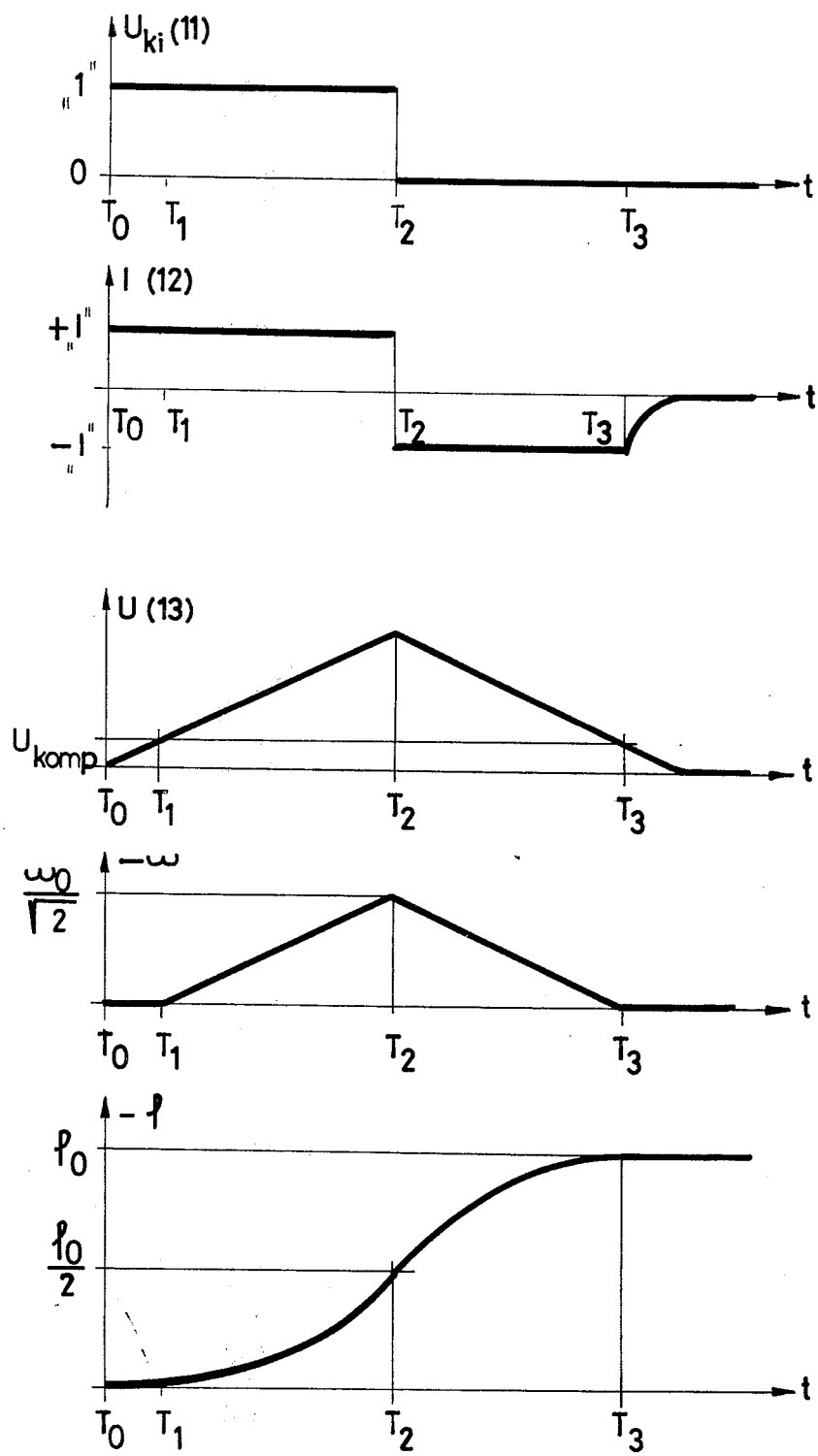
FIG. 2 shows the working mode of the said embodiment by way of a time diagram.

The working of the circuit arrangement will now based on the above be explained as follows:

The operator sets the stylus accurately at the spot of the initial bar jst according to prior art. At the instant $T_o$ (see FIG. 2) he pushes the button of the operating means 10 and, thus, starts the automatic setting back. The state of the store 11 changes to "L" which causes the change over of the correcting means 9 into the "reverse" state, i.e. the sense of the revolution will be "back". The same output state of store 11 causes also the commutating of the speed control unit 4 over its first input 5 to a speed 0.707 times the previously selected standard speed, and the activating of the current generator 12 which charges the capacitor 13 (in a straight-line manner). At the instant $T_1$, the instant voltage of the capacitor 13 reaches the comparing level of the threshold level discriminator 14 (the hysteresis of which being approximately 0).

The output signal of the threshold level discriminator 14 changes and the gate circuit 15 couples a start command to the speed control unit 4. This affects the start of the motor 1—and thus the turntable 2—in the reverse direction with a starting torque $-M$. The torque being a practically constant one, equally constant will be the acceleration of the turntable 2. Thus, a speed of 0.707 times the selected standard speed will be reached at the instant when the edge of the turntable 2 is halfway to the end of the setting back path. This can be seen from the following formula expressing the physical law of constantly accelerating rotation:

$$\frac{\varphi_o}{2} = \frac{\ominus}{M}\left(\frac{\omega_o}{\sqrt{2}}\right)^2 = \frac{\ominus \cdot \omega_o^2}{M \cdot 2}$$

since $$\phi_o = \ominus /M \cdot \omega_o^2.$$

The 0.707 times value of the standard speed will be reached at the instant $T_2$. The output signal of the third output 7 of the speed control unit 4 causes then the clearing of the store 11, the speed control unit 4 gets commutated to the nominal value of the standard speed, the correcting means 9 changes the direction of the torque into the sense of normal work i.e. the torque will now have a braking effect on the motor 1. At the same time the polarity of the current generator 12 will also be changed it will now discharge the capacitor 13. The braking period is just equal to the one of accelerating.

The discharging process affected by the current generator 12 will take just so many time than had taken the charging process. If the level of the capacitor 13 is lowered to the comparing level of the threshold level discriminator 14 at the instant $T_3$ it is true that $$T_3-T_2=T_2-T_1.$$

It can be seen that the combination of store 11, curent generator 12, capacitor 13 and threshold level discriminator 14 as set forth hereinbefore realizes the period copying means the necessity of which had been stated in the general statement of the invention. ("Period-reflector")

The instant $T_3$ is also coinciding with the standstill of the turntable 2, since in both directions torques of the same value have been applied $(+M)=(-M)$. Consequently, the turntable 2 passes during the braking period another rotation angle equal to $\phi_o/2$. The whole path run through by the turntable 2 during the setting back operation amounts up to $$\phi_o/2+\phi_o/2=\phi_o.$$

The distance (in arc) between the initial bar and the stylus is equal to the specific rotation angle $\phi_o$ as necessary at the selected standard speed.

At the moment of standstill, i.e. $T_3$, the output of the threshold level discriminator 14 supplies an inhibit signal to the gate circuit 15, the drive gets switched off and the brake magnet 20 fixes the motor 1 and the turntable 2 at the wanted setting position.

The logical signal appearing at the third output 7 of the speed control unit 4 as well as the output signal of the threshold level discriminator 14 are also applied to control the tone switch 17. Thus, the inhibition of the sound output occurs accurately during the setting back and speed-up periods.

The realization according to the invention of the setting back procedure shows the following advantages:

The setting back and the speed-up are performed under equal conditions; the accuracy of the operation is, thus, not influenced by differences in torque caused by changes in the means voltage, and changes in bearing frictions caused by temperature differences have either no influence on the accuracy.

The accuracy is obviously independent of the operator.

No additional external torque is needed such as braking force because the drive motor supplies the latter one, too. This way abrupt stress effects are avoided which could cause the derailment of the stylus off the groove or at least an inclination thereto.

The control system for the setting back is identical for all standard speeds since it is organized independently of speed.

The signals of both the speed control unit and the period copying means as supplied at $T_3$ and $T_1$ are equally apt to control the movement on the one hand and the disconnection of the sound output channel on the other hand so there is no need for separate delay circuits.

What we claim is:

1. A circuit arrangement for record players performing the setting back of the disc into a predetermined start position comprising a turntable being rigidly coupled to its driving motor on the one hand and to a tachogenerator on the other hand whereas the tachogenerator is coupled to one input of a speed control unit, and the circuit arrangement comprises also a start-operating means, a brake magnet, and a correcting means being coupled over its first input to the first output of the said speed control unit and over its output to the operating input of the said motor, and the second output of the said speed control unit is connected to the operating input of the said brake magnet whereas the improvement consists in that the third output (7) of the said speed control unit (4) is connected to the first input of a store (11), the output of the said store (11) is connected to one output of a controllable current generator (12) as well as to one input of the said correcting means (9) and one input of the said speed control unit (4), the output of the current generator (12) is connected on the one hand to one plate of a storing capacitor (13) the other plate of which being connected to a constant potential such as the common potential of the circuit arrangement and on the other hand to the input of a threshold level discriminator (14) the output of which being connected to one input of a logical gate circuit (15) whereas the output of the said gate circuit (15) is connected to the third input (8) of the said speed control unit (4), and the operating means (10) of the circuit arrangement is connected to the second input of the said store (11) whereas its start-operating means (19) is connected to the other input of the said gate circuit (15).

2. A circuit arrangement as claimed in claim 1, characterized in that it comprises a speed selector unit (18) that is connected to the second input (6) of the said speed control unit (4).

3. A circuit arrangement as claimed in claim 1 or 2, characterized in that it is provided with a tone switch (17) to the control input of which are over a further gate circuit (16) connected on the one hand the third output (7) of the said speed control unit (4) and on the other hand the output of the said threshold level discriminator (14).

* * * * *